Patented Sept. 20, 1949

2,482,508

UNITED STATES PATENT OFFICE 2,482,508

MODIFIED METHYLOL MELAMINE RESINS

Stuart H. Rider, Springfield, Mass., assignor to Monsanto Chemical Company, St. Louis, Mo., a corporation of Delaware No Drawing. Application August 21, 1946, Serial No. 692,137

8 Claims. (Cl. 260—67.6)

This invention relates to modified methylol melamine ether resins. More particularly it relates to methylol melamine ether resins modified with ortho esters of silicon.

An object of this invention is to provide modified methylol melamine ether resins.

A further object is to modify methylol melamine ether resins with ortho esters of silicon.

These and other objects are attained by reacting an ether of a methylol melamine with an ortho ester of silicon under anhydrous conditions.

The following examples are given to illustrate this invention and are not intended to limit the scope thereof. Where parts are mentioned they are parts by weight.

Example I 300 parts (about .75 mol) of an anhydrous methyl ether of hexamethylol melamine were mixed with 200 parts (about 1 mol) of tetraethyl ortho silicate in a suitable vessel provided with a reflux condenser. A calcium chloride tube was placed in the top of the condenser to exclude moisture during the reaction. The mixture was heated at 150° C. for 2½ hours. Excess silicate ester was removed by distillation to yield a rubbery water-white resin, insoluble in water and soluble in xylol.

Example II 650 parts (about 1 mol) of an anhydrous butyl ether of hexamethylol melamine were mixed with 200 parts (about 1 mol) of tetraethyl ortho silicate in a suitable container fitted with a reflux condenser and a calcium chloride moisture trap. The mixture was heated at 180° C. for 2 hours. Excess silicate ester was removed by distillation to produce a soft rubbery water-white resin soluble in aromatic hydrocarbons such as benzene, xylol, etc.

Example III 400 parts (about 1 mol) of an anhydrous methyl ether of hexamethylol melamine were mixed with 180 parts (1 mol) of dimethyl diethyl ortho silicate in a suitable container provided with a reflux condenser and a calcium chloride moisture trap. The mixture was reacted at 130° C. for 4 hours. Excess silicate ester was then removed by distillation to produce a soft rubbery water-white resin soluble in aromatic hydrocarbons.

The reaction conditions must be anhydrous to produce the resins of this invention since the ortho silicates readily hydrolyze in the presence of even very small amounts of water. After the reaction is completed, water has only a slight softening effect on the resin and does not cause hydrolysis. For example a partially cured film immersed in water for 18 hours was only slightly softened and regained its normal hardness after drying for 15 minutes.

The ortho silicates which may be used to produce the resins of this invention are the alkyl derivatives of ortho silicic acid. The alkyl substituents may be identical or two or more different alkyl substituents may be present. Examples of the ortho silicates are tetramethyl, tetraethyl, tetrabutyl, tetraisobutyl, tetraamyl, tetrahexyl, dimethyl diethyl, diethyl dibutyl, etc. orthosilicates.

The methylol melamine ethers which may be used are the alkyl ethers of any of the methylol melamines from mono to hexamethylol melamines or mixtures of the same. Thus the methyl, ethyl, propyl, isopropyl, butyl, isobutyl, amyl, hexyl, octyl ethers of mono, di dri, tetra, penta or hexamethylol, melamines may be used. Care must be taken to eliminate all water including water of crystallization from the methylol melamine ethers prior to the reaction with the ortho silicates.

The ratio of methylol melamine ether to alkyl ortho silicate may be varied over a wide range e. g. 1 mol of methylol melamine ether may be reacted with from about 0.2 to 3 or more mols of alkyl ortho silicate. An excess of the alkyl ortho silicate may be used and the excess removed by distillation after completion of the reaction.

The temperature of the reaction may be varied from about 100 to about 200° C. with a resultant decrease in the reaction time from about 4 hours at 100° C. to about 1 hour at 200° C. No catalyst need be used to accelerate the reaction.

The resins of this invention are soft, rubbery, and generally water-white. They are softened slightly by water and are soluble in hydrocarbon solvents especially those of the aromatic series.

The resins may be partially cured without catalysts at from about 120° C. to about 300° C. to produce hard, glossy flexible films. They are still soluble in aromatic hydrocarbons and will soften slightly when immersed in water but recover their original hardness on removal of the water.

The resins may be further cured to an insoluble, infusible, water-inert stage by incorporating an acid catalyst therein and heating at about 100 to about 200° C. The fully cured resins are extremely hard.

An unusual feature of the uncured resins of this invention is their low viscosity coefficient. For example, at the end of the reaction producing the resins, the resins are so stiff and viscous that they will ride up and cling to the stirring device even though the temperature is about 150° C.; yet at room temperature, ca. 30° C., they are still soft rubbery materials.

The uncured resins are compatible with alkyd resins increasing the hardness of films cast therefrom.

The uncured resins may be used in coating compositions as modifiers for alkyd resins. They may also be used for impregnating paper, glass and textile webs for use in laminates. They are valuable as adhesives particularly in the making of abrasives.

The uncured resins may be modified by the incorporation of conventional additives such as fillers, pigments, dyes, etc.

It is obvious that many variations may be made in the products and processes of this invention without departing from the spirit and scope thereof as defined in the appended claims.

What is claimed is:

1. The resinous heat reaction product under substantially anhydrous conditions of 1 mol of an alkyl ether of methylol melamine with from 0.2 to 3 mols of an alkyl ortho silicate.

2. The resinous heat reaction product under substantially anhydrous conditions of 1 mol of the methyl ether of hexamethylol melamine with from 0.2 to 3 mols of tetraethyl orthosilicate.

3. The resinous heat reaction product under substantially anhydrous conditions of 1 mol of the methyl ether of hexamethylol melamine with from 0.2 to 3 mols of dimethyl diethyl orthosilicate.

4. The process which comprises reacting 1 mol of an alkyl ether of a methylol melamine with from 0.2 to 3 mols of an alkyl orthosilicate under substantially anhydrous conditions at a temperature of from 100–200° C.

5. The process as in claim 4 wherein the alkyl ether of methylol melamine is the methyl ether of hexamethylol melamine.

6. The process as in claim 4 wherein the alkyl ether of methylol melamine is the butyl ether of hexamethylol melamine.

7. The process which comprises reacting 1 mol of the methyl ether of hexamethylol melamine with from 0.2 to 3 mols of tetraethyl orthosilicate under substantially anhydrous conditions at temperatures of from 100 to 200° C.

8. The process which comprises reacting 1 mol of the methyl ether of hexamethylol melamine with from 0.2 to 3 mols of dimethyl diethyl orthosilicate under substantially anhydrous conditions at temperatures from 100 to 200° C.

STUART H. RIDER.

REFERENCES CITED

The following references are of record in the file of this patent:

UNITED STATES PATENTS

| Number | Name | Date |
|---|---|---|
| 2,187,566 | Bruson | Jan. 16, 1940 |
| 2,313,678 | Simons | Mar. 9, 1943 |
| 2,320,817 | D'Alelio | June 1, 1943 |

FOREIGN PATENTS

| Number | Country | Date |
|---|---|---|
| 698,389 | Germany | Nov. 8, 1940 |

OTHER REFERENCES

Official Digest, November 1945, pages 424–441.